(No Model.)

A. A. DILLEHAY.
DENTAL PLUGGER.

No. 502,352. Patented Aug. 1, 1893.

Witnesses:
E. H. Berry
C. M. Clayton

Inventor:
A. A. Dillehay
By W. H. Lamar,
Attorney

UNITED STATES PATENT OFFICE.

ALONZO A. DILLEHAY, OF MERIDIAN, MISSISSIPPI.

DENTAL PLUGGER.

SPECIFICATION forming part of Letters Patent No. 502,352, dated August 1, 1893.

Application filed June 7, 1892. Serial No. 435,855. (No model.)

*To all whom it may concern:*

Be it known that I, ALONZO A. DILLEHAY, a citizen of the United States, residing at Meridian, in the county of Lauderdale and State of Mississippi, have invented certain new and useful Improvements in Dental Pluggers; and I do hereby declare the following to be a full, clear, and exact description of the invention, such as will enable others skilled in the art to which it appertains to make and use the same.

The object of this invention is to provide a simple and inexpensive plugger that shall have a wide range in adjustment and use.

It consists of a sleeve of adjustable length containing a rotary shaft provided with projections that in each revolution strike corresponding projections upon a non-revoluble plunger, forcing it suddenly outward at short internals and thus causing the tool which the plunger bears to give a series of rapid blows.

Figure 1:
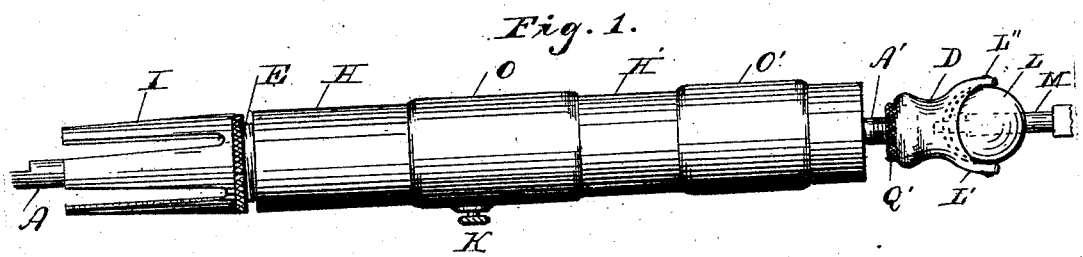
Figure 2:
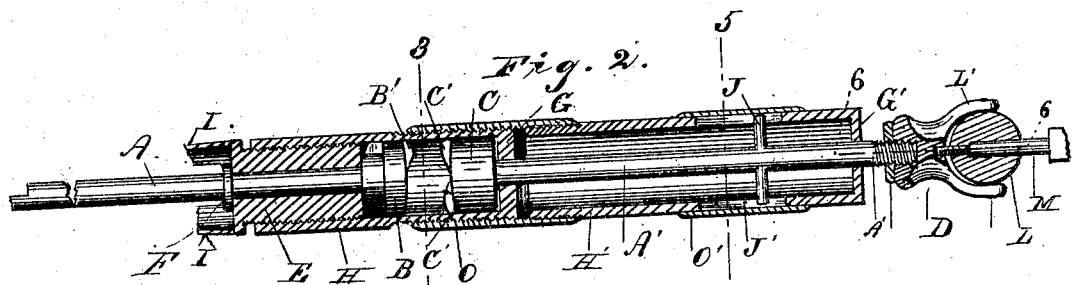
Figures 3, 4, 5:
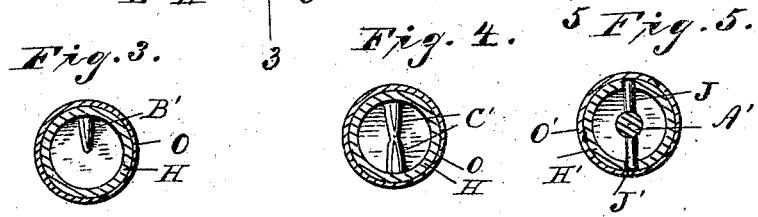
Figures 6, 7:
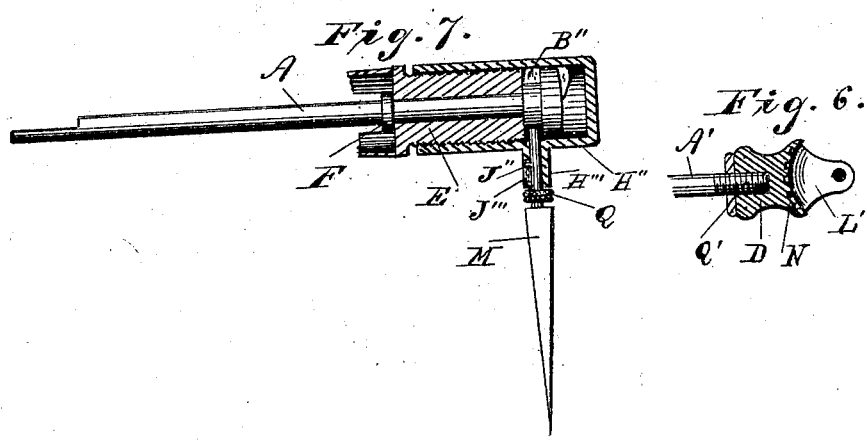

In the drawings,—Figure 1 is a side elevation of the implement. Fig. 2 is a central, longitudinal section of the same. Figs. 3 and 4 are sections on the line 3—3, Fig. 2, looking in opposite directions. Fig. 5 is a section on the line 5—5, Fig. 2. Fig. 6 is a section on the line 6—6, Fig. 2. Fig. 7 is an axial section showing a part of the apparatus of Figs. 1 and 2 replaced by a right angle attachment.

In the drawings, H, H' is a tube made up of two sections adjustably connected by a sleeve O fixed to the section H' and receiving the screw-threaded end of the section H. One end of each section is closed by a fixed block, G, G', and in the opposite end of the section H is a longitudinally adjustable screw-threaded plug E. The latter is centrally perforated to receive a rotary shaft A which is to be connected to the power shaft of a dental engine in the usual manner, springs I upon the plug E aiding in the attachment. The shaft A terminates, just within the plug, in a head B and bears just without the plug a preferably adjustable collar F which, with the head, prevents longitudinal motion of the shaft. The head bears upon its end face a projection B' of wedge-like form and upon its lateral face a projection B'' of analogous shape. The blocks G, G' are also centrally perforated to form bearings for a reciprocating plunger rod A' which is prevented from rotating by rigid arms J working in slots J' in the walls of the tube section H'. At the inner end the plunger rod bears a plunger head C having upon its end face projections C' similar to the projections B' upon the plunger head, while upon its outer end is screwed a tool head D, preferably fixed in the position to which it may have been adjusted, by a lock-nut. Now since the shaft rotates and the plunger cannot, it is evident that when the plunger is so far inward that its lugs overlap those upon the shaft head, it will be forced outward whenever a lug B' meets a lug C'. And if the rotation be rapid it will be thrown against the block G and will rebound, to be again thrown outward by the impinging of the projections B' upon the projections C'. The parts should be so adjusted that the tool head D, or its lock-nut, may strike the block G' and limit the inward rebound of the plunger. In that case the overlapping of the projections B' C', and consequently the force of the blow, may be regulated by screwing the plug E inward or outward. But the force of the blow depends not only upon this initial force but also upon the momentum acquired by the plunger, and this varies with the distance through which it is allowed to pass. Such distance is readily varied by screwing the tube section H into or out of the sleeve Q,—an adjustment that does not interfere with making the adjustment of initial force already described. When great force is desired, both great initial force and great momentum may be had, but this is not the only advantage of the two adjustments, since there is a marked practical difference whether a moderate blow be given principally by initial force applied in this way, or by acquired momentum. A spring may, if desired in any case, be inserted in position to cause or to aid the return stroke, but as the instrument is operative without and as such spring cushions the blow to some extent, if it operates through space enough to be of practical effect, I prefer the device without it. Accidental variation of the length of the whole tube is prevented by a set-screw K.

The tool head D bears a ball L mounted, by means of gudgeons L'' between two arms L' projecting from the tool head. The ball is diametrically perforated to receive the shank M of the tool proper, the perforation being perpendicular to the axis of the ball's rotation upon the gudgeons, and the shank is screw-threaded near its end so that it may readily be made to project to a greater or less extent beyond the inner surface, or side, of the ball to enter one of a series of depressions or recesses N formed in the head in the plane of the shank's rotation about the axis of the ball. By this means the point of the tool may be fixed, at will, in the line of the plunger or at any of several points at either side thereof. It is to be observed, however, that the blow must in any case be in the line of the axis of the shaft A or in a line parallel thereto, and while this direct form is used to a much greater extent than any other, it is also true that it is almost indispensable to have means for striking in a direction transverse to the shaft. I have therefore provided the attachment shown in Fig. 7 to replace a portion of the mechanism already described. In that figure, H″ is a short tube screwed upon the plug E and provided with a lateral tubular branch H‴ in which slides a tool making a right angle with the axis of the shaft. The inner end of the tool shank lies normally in the path of the lug or projection B″ upon the head B, and when the shaft rotates the tool is thrown forcibly outward. The shank is provided with a lug J″ which slides in a slot J‴ in the branch H‴, and when this lug reaches the end of its slot the tool rebounds, the rebound being adjusted by means of lock-nuts O so that the degree of the tool's engagement with the projection B″ may be regulated, for purposes analogous to those set forth in describing the direct plugging devices.

The right angle attachment is not herein claimed, but it is shown to make clear the use of the lateral lug borne by the rotary shaft head. I propose to make separate application involving the attachment.

What I claim is—

1. The combination with the threaded, extensible sleeve having blocks fixed in the corresponding ends of each of its two sections, of a non-rotary plunger sliding in the two blocks and having at each end a head to meet, the corresponding blocks, respectively, and limit the length of the plunger's path; whereby the relative rotation of the sleeve sections varies the length of stroke possible to the plunger.

2. The combination with the threaded, extensible tube or sleeve having blocks fixed in the corresponding ends of its two parts, of a non-rotary plunger sliding in the two blocks and bearing at its ends heads in position to meet said blocks, respectively, and limit the length of the plunger's path, a rotary shaft mounted in a longitudinally adjustable bearing screwed into the outer end of the tube, and having at its inner end a head bearing a lug adapted to impinge upon corresponding lugs upon the head at the inner end of the plunger and force the latter outward; whereby relative rotation of the sleeve sections and relative rotation of the shaft bearing and the sleeve in which it is placed, will give any desired combination of initial force and length of stroke.

3. In a dental plugger, the combination with a suitably mounted plugging tool, of a rotary shaft mounted in suitable bearings, and a head upon its inner end comprising a disk provided with projections upon its front and side faces extending substantially at right angles to each other, whereby it is adapted to drive a tool in line with, or at right angles to said shaft, substantially as described.

4. The combination with the tool head, of a ball pivoted therein and perforated transversely to its pivotal axis to receive a tool shank; said head being provided with a series of recesses to receive the projecting end of a tool shank passed through the ball.

In testimony whereof I affix my signature in presence of two witnesses.

ALONZO A. DILLEHAY.

Witnesses:
G. HENDERSON,
B. V. WHITE.